April 26, 1960 P. M. CHRISTENSEN 2,934,623
COMBINATION CIRCUIT BREAKERS
Filed June 11, 1956 2 Sheets-Sheet 1
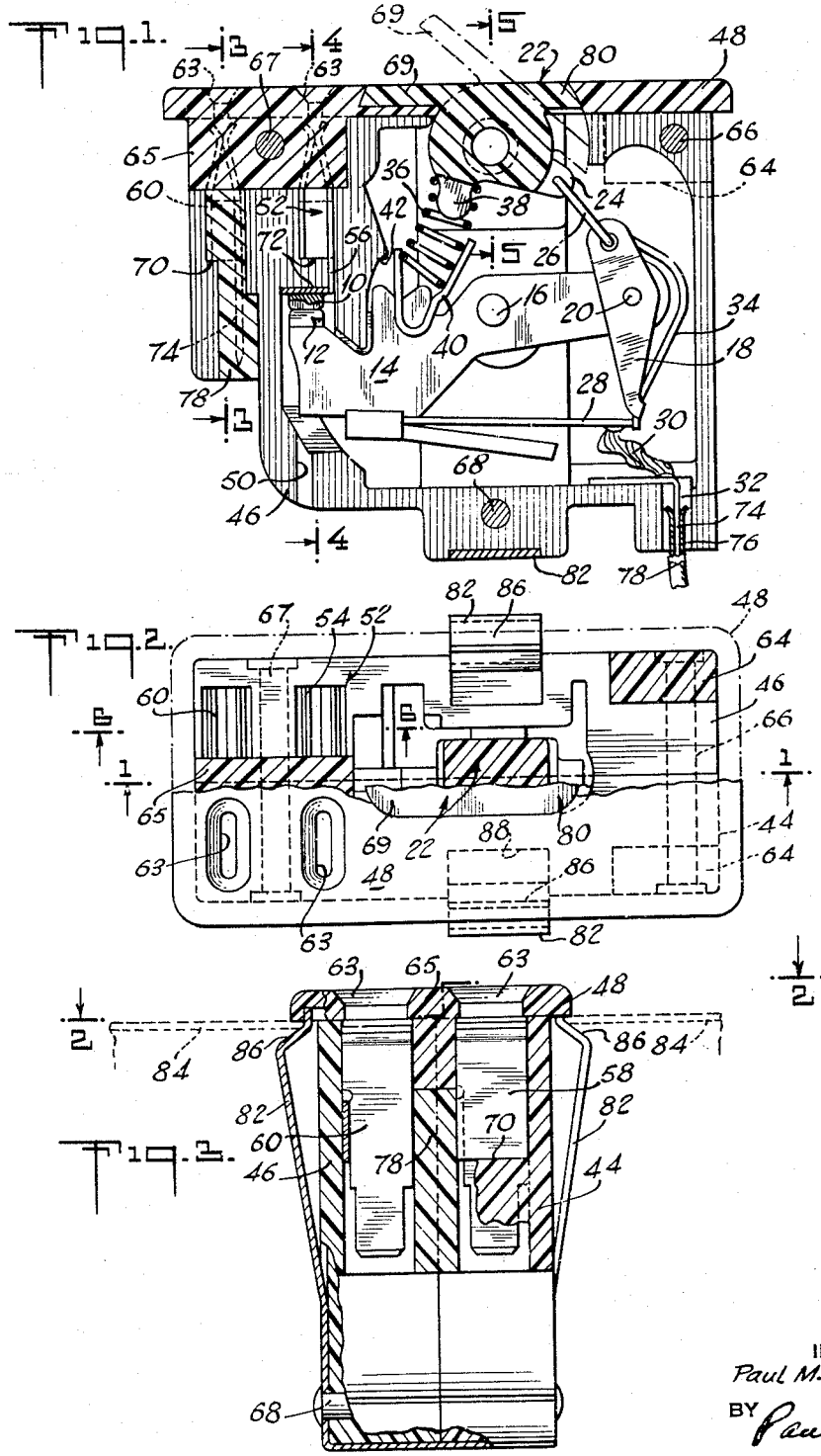
INVENTOR
Paul M. Christensen
BY Paul S. Martin
ATTORNEY April 26, 1960   P. M. CHRISTENSEN   2,934,623
COMBINATION CIRCUIT BREAKERS
Filed June 11, 1956   2 Sheets-Sheet 2
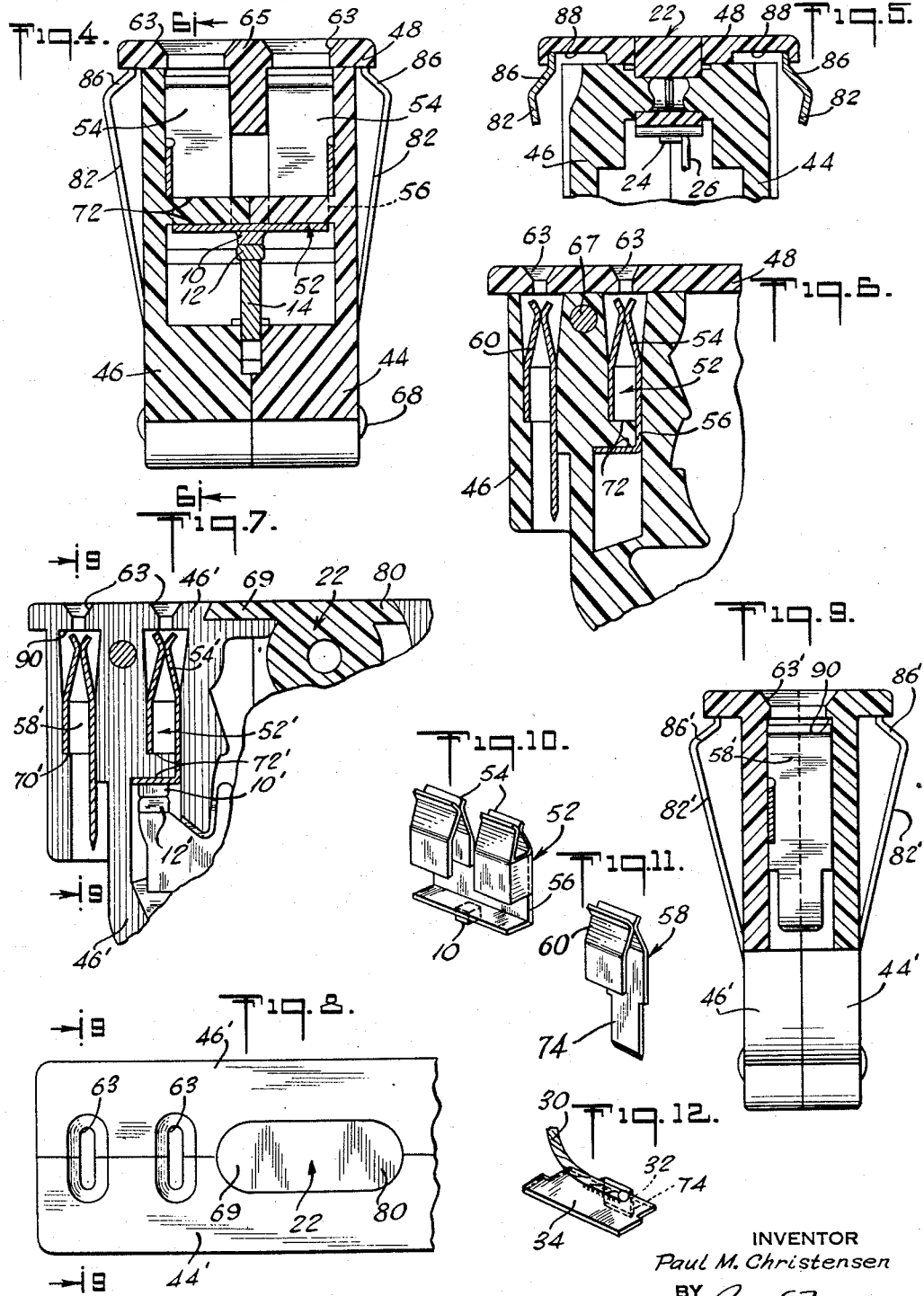
INVENTOR
Paul M. Christensen
BY
ATTORNEY United States Patent Office 2,934,623
Patented Apr. 26, 1960

2,934,623

COMBINATION CIRCUIT BREAKERS

Paul M. Christensen, West Orange, N.J., assignor to Federal Pacific Electric Company, a corporation of Delaware Application June 11, 1956, Serial No. 590,583

14 Claims. (Cl. 200—115.5)

The present application relates to novel circuit breakers and in particular to a unitary combination of a circuit breaker and one or more outlets or receptacles protected thereby. Circuit breakers have been employed extensively in panelboards and in entrance equipment to protect the wiring of the several distribution circuits extending from a central supply point. The circuit breaker serves there not only to interrupt the power to each separate circuit in the event of an overload, but also as a switch to disconnect power from that circuit when it becomes necessary to do work on the wiring of the protected circuits. In common concept, accordingly, a circuit breaker is used both as switching device and as overload protector.

The present invention relates to features of construction promoting effective application of mechanisms heretofore applied in the foregoing entrance and panelboard equipment for a new purpose, namely, for protection of a circuit at a load-point where one or more individual loads are connected. In this aspect, the present invention has as an object the provision of a novel combined outlet, or "convenience outlet" as it is commonly called, and a circuit breaker in a unitary structure.

Circuit breakers of the molded case type for comparatively low current ratings commonly are formed of a pair of molded elements of insulation containing the circuit breaker mechanism, and from which an operating handle projects. The material from which the two parts of the case or enclosure have been made has been dictated both by the mechanical properties required for supporting and furnishing stress-resistance to the mechanism, and by the electrical insulation and arc resistant properties of the molded material. In a further aspect, the present invention provides a novel enclosure for circuit breakers and for combined circuit breakers and convenience outlets formed of three parts including the two-part housing supporting the mechanism and, in addition, a third part forming a front cover that presents an unbroken front surface. Beyond being more attractive when in prominent, exposed locations, this construction avoids the possibility of difficulties arising from an exposed crevice that would otherwise be exposed between the casing parts. Also, convenience outlets having openings formed in such unitary front part of insulation are stronger than they would be were the front made up of abutting parts of molded insulation.

It is contemplated that the novel circuit breakers will be used, for example, as on the control panel of a domestic electric range or on other appliances exposed prominently to access and to the possibility of dirt collection and, possibly, to the splash of liquids. In such applications the importance of eliminating the crevice that characterizes two-part enclosures will be readily appreciated.

In one of the illustrative embodiments that are described in detail below the two-part housing of insulation of known circuit breakers is improved by provision of a front cover of insulation, through which an operating handle or reset lever of the circuit breaker is accessible, and this is of such form as to minimize the increased complexity and cost of the unit. The large scale use of circuit breakers in place of fuses has come about to a large extent by reduction of complexity and manufacturing cost of these devices. Accordingly, in any new form of circuit protector the matter of manufacturing cost and complexity is of critical practical importance if the public is to have the benefit of the new device.

A further aspect of the present invention relates to the provision of a novel form of operating handle for reclosing the circuit breaker after having been automatically tripped and, at the same time, making possible the manual opening of the circuit if this should prove desirable for any reason. Both of these functions have been achieved and in addition the essential flat front presented by the novel devices is preserved unbroken by the projecting operating handle that characterizes usual circuit breakers. This is of considerable importance when the circuit breaker is employed as part of an appliance and it is also important where the circuit breaker is employed in a wall installation, as in the usual practice of installing convenience outlets. A handle that projects when in normal operating condition inherently is hazardous because it is exposed to be struck and broken with possible breakage within the unit resulting. The present invention provides an operating handle which is flush with the front of the device when the circuit breaker is closed, yet which can be tripped when needed in the manner of a switch to open the protected circuit. As will be seen, this feature is one of several which do not require a three-part enclosure yet can be used effectively with such enclosure construction.

Further features of the invention relate to the incorporation with the circuit breaker of a female receptacle for a male plug and electric cord of a plug-in appliance as a unitary part of the novel circuit breaker. A still further feature of the invention relates to the arrangement of the convenience outlet in relation to the operating handle of the overload protector so that, if a short circuit or overload should develop in the plug-in device, the operating handle cannot be manipulated to re-set the tripped contacts without first removing the plug from the outlet of the combined unit.

Further novel features are discussed in connection with the detailed description of the illustrative embodiments of the invention below in which reference is made to the accompanying drawings forming part of the disclosure.

In the drawings:

Figure 1 is a vertical central section of an illustrative embodiment of the invention viewed from the line 1—1 of Fig. 2;

Fig. 2 is a top view of the device in Fig. 1 with a portion thereof broken away and parts shown in fragmentary cross-section;

Fig. 3 is a cross-section viewed from the line 3—3 of Fig. 1, with a supporting panel shown in phantom lines;

Fig. 4 is a cross-section viewed from the line 4—4 of Fig. 1;

Fig. 5 is a fragmentary cross-section viewed from the line 5—5 in Fig. 1;

Fig. 6 is a fragmentary cross-section along the lines 6—6 of Fig. 2;

Fig. 7 is a fragmentary cross-section of a device similar to that in Fig. 1, modified to incorporate only a single convenience outlet whereas the embodiment of Figs. 1 to 6 inclusive includes a duplex outlet;

Fig. 8 is a fragmentary plan view of the device in Fig. 7;

Fig. 9 is a cross-section viewed from the line 9—9 of Fig. 7;

Fig. 10 is a perspective view of one of the components in the embodiment of Figs. 1 to 6;

Fig. 11 is a perspective view of a component of the embodiments in Figs. 1–6 and 7–9; and Fig. 12 is a perspective of a component of the embodiment of Figs. 1–6.

Referring now to Figs. 1 to 6 and 10 to 12, there is shown a combined circuit breaker and duplex outlet embodying features of the present invention.

An enclosure of molded insulation encloses circuit breaker mechanism, generally of a well-known type, more fully described in Patent No. 2,681,396. The circuit breaker mechanism includes a fixed contact 10 and a contact 12 movably carried by contact arm 14 that is rockable about a pivot 16 the ends of which are supported in the side walls of the enclosure. Pivot 16 is in the form of a helical spring whose axis extends perpendicular to the plane of Fig. 1. An actuator 18 has an insulated pivot 20 by which it is carried on and insulated from contact arm 14. Handle 22 of molded insulation is pivotally supported in the housing and has one arm 24 formed with a hole receiving one leg of U-shaped link 26. The other leg of this U-shaped link is received in the upper end of actuator 18. Contact arm 14 has a bimetal 28 fixed thereto, which bimetal is connected via conductive braid 30 to a terminal 32 (Fig. 12) that is received in lateral recesses in the enclosure and is thereby fixed in position. An ambient temperature compensating bimetal 34 is pivotally anchored at the upper end of actuator 18 while the lower end of bimetal 34 is slidably guided in the lower end of actuator 18 for decreasing or increasing the length of that lower arm and thus compensating for ambient temperature effects which variably deflect current bimetal 28.

A compression spring 36 is confined between handle 22 at its upper end, there fixed in position by arm 38 of handle 22; and this compression spring bears against V-shaped snap-lever 40 that is rockably carried on contact arm 14. Snap-lever 40 coacts with an arresting surface 42 formed in the housing so that, as handle 22 is gradually moved from the circuit-breaker-open position (shown in dot dash lines in Fig. 1) to the closed position (shown in full lines) contact arm 14 is arrested until near completion of the contact-closing operation of the handle, after which snap lever 40 is released and contact arm 14 closes contact 12 against contact 10 with snap action.

The circuit breaker mechanism thus far described operates as follows: When the circuit breaker is closed and an overload occurs, bimetal 28 heats as a result of current passing therethrough and deflects downward. When sufficient heating has taken place to deflect bimetal 28 below the tip of compensating bimetal 34, that bimetal and actuator 18 which carries it are released. Contact arm 14 is abruptly driven counterclockwise by spring 36, and actuator 18 (articulated to U-shaped link 26 and handle 22) swings clockwise. This presumes no motion in handle 22. Opening of the contacts is thus effected even though the operating handle of a circuit breaker is held in its "closed" position; and this type of circuit breaker therefore is called "trip-free."

The upper portion of actuator 18 and link 26 constitutes a toggle during this operation. The toggle is "set" over center when the contacts are closed. With the circuit breaker closed, the upward pressure of spring 36 against handle 22 is transmitted as a compressive stress along link 26. However, when actuator 18 has been released by bimetal 28, this compressive stress is no longer resisted. The handle 22 may be free to return from the "closed" position shown in full lines in Fig. 1 to the "open" position represented in dot-dash lines. This motion of the operating handle is prevented under certain circumstances, more fully discussed below. However, if and when handle 22 is allowed to swing to its "open" position under pressure of spring 36, it tensions link 26 to reverse the stroke of actuator 18 until the lower tip of bimetal 34 is to the right of the position illustrated and in condition again to engage the end of bimetal 28 in the course of subsequent closing operation of handle 22. It is thus evidently necessary to cause shifting of the operating handle 22 from "closed" position shown to "open" position which is also the reset position of the handle before the circuit breaker can be reclosed after automatic opening of the contacts.

The material forming the enclosure of insulation previously mentioned is formed of three principal molded parts including a pair of side parts 44 and 46 and a top part 48. Molded parts 44 and 46 have lateral recesses and other formations which receive and locate the endwise projecting pivots of handle 22, the ends of spring pivot 16, and the edges of terminal member 32. These molded parts also form an operating chamber containing the operating mechanism of the circuit breaker and in addition the molded parts form an arc chamber in the region between contacts 10 and 12, which arc forms as the contacts separate while the circuit breaker carries current. Grooves 50 in each part 44 and 46 (one of which is shown in Fig. 1) form a vent for relief of pressure built up by an arc in the arc chamber during circuit interruption.

Fixed contact 10 is united to a double clip member 52 (Fig. 10) which is received and located in position in the molded casing parts 44 and 46 as is more fully illustrated in Fig. 4. Member 52 embodies a pair of clips 54 which extend upward from a bridging portion 56.

A separate pair of clips 58 and 60 are received in recesses in casing parts 44 and 46 respectively, opposite the previously described clips 54, arranged in a rectangle.

A cover 48 of molded insulation has a pair of downward extending lugs 64 integral therewith and a further integral downward extending lug 65 which is interposed between the two clips 54 of member 52 and which also extends between the two clips 58 and 60. Openings 63, flared upward to receive the prongs of an inserted male plug (not shown) are narrow and prevent clips 58 and 60 from rising when frictionally drawn upward during removal of a plug. Cover 48 is thus secured in the position illustrated and prevents the clips from moving out of place. Cover 48 is held in position by a pair of rivets 66 and 67 which extend through integral downward projecting portions 64 and 65 of the cover, these rivets thereby uniting all three parts of the enclosure. An additional rivet 68 supplements the rivets 66 and 67 in holding the enclosure parts 44 and 46 together.

A male plug having two prongs can be inserted into the lower pair of openings 63 shown in Fig. 2, the prongs of this plug engaging member 58 and one of the clips 54 of double clip member 52. With the circuit breaker closed a circuit may then be traced from terminal member 32 through flexible braid 30, current responsive bimetal 28, moving contact arm 14, moving contact 12, fixed contact 10, member 52 and clip 54, and separate terminal clip 58. A similar separate current path can be traced through the same circuit breaker parts and member 52, to separate terminal clip 60 by way of the other clip 54 on member 52 and the load plugged into clips 54 and 60.

In a common use a load device may be plugged into either one of the duplex outlets embodied in the combined outlet and circuit breaker in Figs. 1 to 6. Members 58 and 60 are electrically insulated from each other in order that one may go directly to the neutral of the power line and the other may go by way of a timing mechanism (for example) to the neutral of the power line. If no such timer is to be placed in series with one of the outlets, or if the timer is to control both outlets, members 58 and 60 might be made of one piece as in the case of member 52. If an overload occurs in either device or both devices plugged into the duplex convenience outlet, bimetal 28 will overheat and the circuit breaker will open to deenergize both parts of the duplex outlet.

When this occurs, spring 36 tends to drive the handle 22 to its open position in the solid lines in Fig. 1. However, as is evident from Figs. 1 and 2, the left-hand arm 69 of handle 22 extends to a position quite close to openings 63 of the convenience outlets. Because of this, male plugs of moderate size tend to overlie arm 69 of the handle in its closed position. The plugs are securely held by clips 54, 58 and therefore hold arm 69 in its "on" or "closed" position even though the circuit breaker mechanism may have tripped open automatically. In order to reclose the circuit breaker it is then necessary to pull the plugs from the outlets in order that handle 22 may move to its "open" position and to allow actuator 18 to be reset, in condition for again engaging the end of bimetal 28 and for operating link 26 and contact arm 14 to be operated in the contacts-closing direction by manipulation of the handle. This arrangement provides assurance that unless the possible causes of overloading or short circuit are removed from the combined unit the circuit breaker cannot be again closed.

Clips 58 and 60 are received, as has been noted, in lateral recesses in the molded enclosure parts 44 and 46. These elements are prevented from being lifted out of the enclosure as a result of frictional engagement with the inserted plug when such plug is being withdrawn, because the openings 63 are small and the enclosure top 48 provides abutments arresting any such lift of clips 58 and 60. Conversely, when a male plug is being inserted, a shouldered portion 70 of the respective enclosure parts prevents downward shift of the clips 58, 60.

Clips 54 are similarly prevented from moving downward by an abutment 72 formed in each enclosure part 44 and 46. The pressure against contact 10 produced by contact 12 is also resisted by the opposite face of an integral formation or shoulder portion 72 of the enclosure parts 44 and 46.

Each of the clips 58 and 60 and terminal 32 has a downward-extending spade terminal portion 74. These spade portions terminate within the outline of the molded enclosure parts 44, 46 and a free space surrounds them for receiving a terminal clip 76 on the wire 78 which connects the device to the line and the neutral, etc., for connection to the electrical circuit that is to energize the convenience outlet. By virtue of this rearward direction of the spade terminals 74 (opposite the front of the enclosure where the outlet opening and the circuit breaker handle appear), the wiring is all simple and direct, accomplished solely from the rear. It has been mentioned that members 58 and 60 are formed as separate parts which may operate at different potentials in the normal course of events. For this reason, because the two portions 44 and 46 of the enclosure do not complete the insulated separation between members 58 and 60, a filler 78 of insulation is interposed between members 58 and 60, received in a complementary pair of recesses in molded parts 44 and 46.

In the course of assembling the device illustrated in Figs. 1 to 6, the parts of the mechanism are assembled into one of the two parts 44 or 46 of the enclosure. Thus, all the parts shown, with the exception of the rivets 66–68, and with the further exceptions of the cover 48 and one of the two clips 58, 60, are put in assembled position, with the parts in circuit-breaker-open configuration. With the second part of the molded enclosure in position, the second clip 58 is then dropped into position from above, after which molded top or cover 48 completes the assembly.

Handle 22 as previously mentioned has a left-hand arm 69 which is operated to close the circuit breaker; and, when closed, handle 22 presents a surface that is flush with cover 48. It might be possible to provide a finger recess to lift arm 69 and thereby open the circuit breaker. However, a further feature of the handle construction voids this awkward manipulation. Handle 22 is formed with a second arm 80 extending opposite arm 69, which arm 80 may be depressed if it is desired for any reason to trip the circuit breaker into open condition. Handle 22 has two modes of operation, one in which arm 69 is pushed to make the handle flush with the top 48 and the other in which arm 80 is pushed to cause arm 69 to project.

As seen in Fig. 2 and more prominently in Fig. 8, arm 80 of the handle has a rounded end contour and this is matched by a complementary contoured relief in the top 48 and in the contiguous portions of molded parts 44 and 46 of the enclosure. The relief is a figure of revolution about the axis of handle 22, for example in the form of the outside surface of a segment of toroid. This complementary construction makes it possible to have the tip-operation of the handle with rounded ends thereon, at the same time avoiding formation of passages through which tampering instruments might be poked or through which hot arc gases might be expelled.

As seen in Figs. 3, 4 and 5, a pair of clips 82 of springy sheet metal, formed of one piece, are secured by rivet 68 to the outside of the enclosure, for mounting the combined unit on a panel 84. These clips have shoulders 86 that prevent upward movement of the unit. Cover 48 extends flange-like beyond the limits of molded parts 44 and 46 and prevents downward movement of the unit. The ends of clips 82 are received in reliefs 88 (Fig. 5) so that clips 82 may be pressed against the side walls of enclosure portions 44 and 46 for insertion and removal of the unit from panel 84 free of obstruction by shoulders 86.

It is evident that the duplex outlet of Figs. 1–6 may readily be reproportioned as a single outlet centered within opposed molded parts 44 and 46. When this is done, the function of portion 65 of top 48 of this enclosure is in part eliminated, namely, that of separating the two clips 58 and 60. A single integral cover 48 of the enclosure is still effective to present an unbroken exposed surface.

While cover 48 as a third molded part of the enclosure of insulation has many advantages, including the distinctive advantage of presenting an unbroken front, the advantages of such third part may be dispensed with in utilizing other aspects of the invention described. Thus, a circuit breaker combined with a single outlet may be made like the embodiment of Figs. 1 to 6, except that the enclosure of insulation is formed in (Figs. 7–9) two parts, with a crevice appearing along the front. Enclosure portions 44' and 46' of the unit with the two-part enclosure in Figs. 7, 8 and 9 incorporates the functions and general configuration of top 48 in the embodiments of Figs. 1 to 6. Thus in Fig. 7, a single clip member 52' carrying fixed contact 10' has a single clip 54' which is arrested against upward and downward movement by enclosure formation 72'; and clip 58' is arrested against downward movement by shoulder 70' when a male plug is pushed in; and this clip 58' is arrested against moving upward when the male plug is to be withdrawn, by virtue of a shoulder 90 in each of the enclosure portions 44' and 46'. Clip 82' (Fig. 9) is also provided for mounting, the two-part enclosure being formed with reliefs (as in Fig. 3) for receiving the legs of such clips during installation of the unit.

The two forms of enclosure, that of Figs. 1–6 and that of Figs. 7–9, have the same flush operating handle that is arranged to have a tamper-proof fit in the enclosure, which fit also resists the occasional tendency of arc heat to expel hot gas from the front. Further, by applying a luminous coating to the side surfaces of this handle and the portions of the cavity exposed when handle arm 80 is depressed, a contrasting signal is available to show in the dark when this circuit breaker has a handle in open position and where the handle is located. This is particularly useful in circuit breakers wherein the appliance plug does not overlie the handle, which then rises upon tripping of the circuit breaker.

The foregoing descriptions of two embodiments of the invention illustrate applications of the various features of the invention. These features are naturally susceptible to modification and they may be employed in varied devices, so that the invention should properly be broadly construed in a manner consistent with its spirit and scope.

I claim:

1. In combination, a multipart enclosure of insulation, circuit breaker mechanism contained therein including a pair of separable contacts, manually operable mechanism including an operating handle to open and close said contacts, and overload responsive means effective automatically to cause opening of the contacts, said enclosure including a confronting pair of parts of insulation abutting each other and embodying an operating recess and supporting formations for the enclosed mechanism, said enclosure further including a front part of insulation across both of said pair of parts and covering the crevice formed where said pair of parts are in abutment and forming a wall of said recess, said handle extending through said front part, said front part embodying multiple integral projections extending into confronting relationship with said pair of enclosure parts, and plural fastening elements, each element extending through both said pair of parts and one of said projections and effective to unite said three enclosure parts.

2. In combination, a multipart enclosure of insulation, circuit breaker mechanism contained therein including a pair of separable contacts, manually operable mechanism including an operating handle to open and close said contacts, overload responsive means effective automatically to cause opening of the contacts, and terminal clips for engagement by a plug-in device, one of the clips being connected to said circuit breaker mechanism, said enclosure including a confronting pair of parts of insulation abutting each other and embodying an operating recess and embodying supporting formations for the enclosed mechanism and for said terminal clips, said enclosure further including a front part of insulation across both of said pair of parts and covering the crevice formed where said pair of parts are in abutment and forming a wall of said recess, said front part having a complementary opening for said handle and having openings aligned with said clips.

3. In combination, a multipart enclosure of insulation, circuit breaker mechanism contained therein including a pair of separable contacts, manually operable mechanism including an operating handle to open and close said contacts, overload responsive means effective automatically to cause opening of the contacts, and terminal clips for engagement by plug-in devices fixed in said enclosure, said clips including a double clip having portions for two different plug-in devices and a pair of single clips opposite respective portions of said double clip, said double clip being connected to said circuit breaker mechanism, said enclosure including a confronting pair of parts of insulation abutting each other and embodying an operating recess and embodying supporting formations for the enclosed mechanism and for said terminal clips, said enclosure further including a front part of insulation across both of said pair of parts and covering the crevice formed where said pair of parts are in abutment and forming a wall of said recess, said handle extending through said front part, said cover embodying multiple integral projections extending into confronting relationship with said pair of enclosure parts, fastening elements extending through both said pair of parts and said projections and effective to unite said three enclosure parts, and insulating means including one of said integral projections interposed between said pair of single clips.

4. In combination a multipart enclosure of insulation, circuit breaker mechanism contained therein including a pair of separable contacts, manually operable mechanism to open and close said contacts and including a trip-free manual operator having multiple-operative positions including a "contacts-open" position in which the operator projects from the enclosure and a "contacts-closed" position in which the operator is flush with the outside surface of the enclosure, overload-responsive means effective automatically to cause opening of the contacts, and a pair of metal clips adjacent each other within the enclosure but separated from each other by insulation and exposed through openings in the exterior of the enclosure for receiving a plug-in device, only one of said clips being connected to the circuit breaker mechanism internally of the enclosure, one of the openings in the enclosure through which said clips are exposed being immediately adjacent to the handle when in said "contacts-closed" position so that the plug of a plug-in device overlies part of the manual operator when the circuit breaker is closed or tripped and the plug is in the clips.

5. In combination a multipart enclosure of insulation, circuit breaker mechanism contained therein including a pair of separable contacts, manually operable mechanism to open and close said contacts, overload-responsive means effective automatically to cause opening of the contacts, a pivoted operating handle for said manually operable mechanism, said handle having multiple operative positions including a "contacts-open" position in which the handle projects from said enclosure and a "contacts-closed" position in which the handle is flush with the outside surface of the enclosure, and a pair of metal clips adjacent each other within the case but separated from each other by insulation and exposed through openings in the exterior of the enclosure for receiving a plug-in device, only one of said clips being connected to the circuit breaker mechanism internally of the enclosure, one of the openings in the enclosure through which said clips are exposed being immediately adjacent to the handle when in said "contacts-closed" position so that the circuit breaker when tripped by an overload in a plug-in device cannot be re-set without first withdrawing the plug of the plug-in device which overlies the handle.

6. In combination a multipart enclosure of insulation, a circuit breaker mechanism contained therein including a pair of separable contacts, manually operable mechanism to open and close said contacts, overload-responsive means effective automatically to cause opening of the contacts, and a two-armed pivoted operating handle for said mechanism, the arms of the handle extending in opposite directions so that the handle may be pivoted in either direction by pushing one of said arms, said two-armed handle having multiple operative positions including one position in which one of the handle arms projects prominently from the enclosure and the other arm is prominently in a recessed position, and said handle having another position in which both arms of the handle are relatively flush with the outside surface of the enclosure and in which said other arm is exposed for manual pressure actuation.

7. In combination a multipart enclosure of insulation, a circuit breaker mechanism contained therein including a pair of separable contacts, manually operable mechanism to open and close said contacts, overload-responsive means effective automatically to cause opening of the contacts, and a two-armed pivoted operating handle for said mechanism, the arms of the handle extending in opposite directions so that the handle may be pivoted in either direction by pushing one of said arms, said handle having multiple operative positions including one position in which one of the handle arms projects prominently from the enclosures and the other arm is disposed in a prominently recessed position, and another position in which both arms of the handle are relatively flush with a substantially flat outside surface of the enclosure and in which said other arm is exposed for manual pressure actuation, and a pair of clips in the enclosure accessible to a plug-in device via openings in said substantially flat surface, only one of said clips being connected to said circuit breaker mechanism.

8. In combination a multipart enclosure of insulation, a circuit breaker mechanism contained therein including a pair of separable contacts, manually operable mechanism to open and close said contacts, overload-responsive means effective automatically to cause opening of the contacts, and a pivoted operating handle for said mechanism having operating portions extending in opposite directions so that the handle may be pivoted in either direction by pushing one of said portions, said handle mechanism having limits establishing two opposite operative positions including one position in which one of the handle portions projects prominently from the enclosure and the other portion is disposed in a prominently recessed position, and other position in which both arms of the handle are relatively flush with the outside surface of the enclosure and in which said other portion of the handle is exposed for manual pressure operation.

9. A circuit breaker in accordance with claim 8 wherein the handle has convexly curved extremities, and in which said enclosure has a complementary toroidal surface along which said other handle portion moves in moving into said changing from flush position to recessed position.

10. In combination, a multipart enclosure of insulation, circuit breaker mechanism contained therein including a pair of separable contacts, manually operable mechanism to open and close said contacts, overload-responsive means effective automatically to cause opening of the contacts, and a pair of metal clips adjacent each other within the enclosure but separated from each other by insulation and exposed through openings to the exterior of the case for receiving a plug-in device, one of said clips having a portion bearing one of said contacts, and said enclosure embodying formations coacting with said one clip and with the contact-bearing portion thereof for resisting oppositely directed stresses of a plug-in device in being inserted and removed and in resisting the pressure of the other of said pair of contacts.

11. In combination, a multipart enclosure of insulation, circuit breaker mechanism contained therein including a pair of separable contacts, manually operable mechanism to open and close said contacts and including an operating handle accessible at the front of the enclosure, overload-responsive means effective automatically to cause opening of the contacts, and a group of metal clips adjacent each other within the enclosure, including one double and two single clips arranged in a rectangle, separated from each other by insulation and exposed through openings in the front of the enclosure adjacent said operating handle, said double clip being connected to the circuit breaker mechanism, and said single clips being disposed relative to said double clip to constitute therewith two plug-in receptacles.

12. In combination, a multipart enclosure of insulation, circuit breaker mechanism contained therein including a pair of separable contacts, manually operable mechanism to open and close said contacts and including an operating handle accessible at the front of the enclosure, overload-responsive means effective automatically to cause opening of the contacts, and a group of metal clips adjacent each other within the enclosure, including one double and two single clips arranged in a rectangle, openings in the front of the enclosure adjacent said operating handle, said double clip being connected to the circuit breaker mechanism, and said single clips being disposed relative to said double clip to constitute therewith two plug-in receptacles, and three externally accessible terminals extending rearwardly and connected respectively to said single clips and to said circuit breaker mechanism.

13. In combination, a multipart enclosure of insulation, circuit breaker mechanism contained therein including a pair of separable contacts, manually operable mechanism to open and close said contacts, overload-responsive means effective automatically to cause opening of the contacts, and a pivoted operating handle for said mechanism having multiple operative positions including one position in which a first part of the handle projects prominently from the front of the enclosure and a second part of the handle assumes to a prominently recessed position, and another position in which the handle is relatively flush with the enclosure and in which said part is externally accessible for manual pressure actuation, and a pair of metal clips adjacent each other within the enclosure but separated from each other by insulation and exposed through openings in the front of the enclosure for receiving a plug-in device, only one of said clips being connected to the circuit breaker mechanism internally of the case, those surfaces of said handle and of the enclosure that are exposed only when said handle is in said one position having a luminous surface and said surfaces being concealed by said handle when in its said relatively flush position.

14. In combination, an enclosure of insulation, circuit breaker mechanism contained therein including a pair of separable contacts, manually operable mechanism to open and close said contacts, overload-responsive means effective automatically to cause opening of the contacts, said handle and said enclosure having relatively movable portions at least one of which is provided with a luminous coating that is exposed when the handle is in its contacts-open position, said coating being concealed by said handle when the handle is moved into its contacts-closed position.

References Cited in the file of this patent

UNITED STATES PATENTS

| | | |
|---|---|---|
| 741,490 | Handy | Oct. 13, 1903 |
| 1,136,498 | Tower | Apr. 20, 1915 |
| 1,989,801 | Halinka | Feb. 5, 1935 |
| 2,191,501 | Schmidt | Feb. 27, 1940 |
| 2,198,840 | Pittman et al. | Apr. 30, 1940 |
| 2,233,187 | Von Hoorn | Feb. 25, 1941 |
| 2,242,232 | Cappelle | May 20, 1941 |
| 2,320,357 | Platz et al. | June 1, 1943 |
| 2,416,266 | Landmeier | Feb. 18, 1947 |
| 2,437,802 | Adler | Mar. 16, 1948 |
| 2,536,944 | Kirby | Jan. 2, 1951 |
| 2,615,963 | Millen | Oct. 28, 1952 |
| 2,661,414 | Casey | Dec. 1, 1953 |
| 2,788,423 | Lang | Apr. 9, 1957 |
| 2,811,606 | Norden | Oct. 29, 1957 |

FOREIGN PATENTS

| | | |
|---|---|---|
| 914,606 | France | June 24, 1946 |